United States Patent
Weng et al.

(10) Patent No.: US 7,606,457 B2
(45) Date of Patent: Oct. 20, 2009

(54) WIRE-FREE SENSING APPARATUS FOR DISC SYSTEM

(75) Inventors: Daniel Weng, Taipei Hsien (TW); Chang-Yuan Chan, Taipei Hsien (TW); Mars Su, Taipei Hsien (TW)

(73) Assignee: Acard Technology Corp., Taipei Hsien (TW)

( * ) Notice: Subject to any disclaimer, the term of this patent is extended or adjusted under 35 U.S.C. 154(b) by 575 days.

(21) Appl. No.: 11/293,937

(22) Filed: Dec. 5, 2005

(65) Prior Publication Data

US 2007/0080615 A1    Apr. 12, 2007

(30) Foreign Application Priority Data

Sep. 26, 2005    (TW) .............................. 94133418 A

(51) Int. Cl.
*G02B 6/00* (2006.01)
*G11B 7/00* (2006.01)

(52) U.S. Cl. .................. 385/135; 385/12; 361/685; 720/660

(58) Field of Classification Search .................. 385/135, 385/12; 361/685
See application file for complete search history.

(56) References Cited

U.S. PATENT DOCUMENTS

| | | | |
|---|---|---|---|
| 3,958,239 A | | 5/1976 | Green |
| 4,629,090 A | * | 12/1986 | Harris et al. .................... 221/7 |
| 4,685,095 A | * | 8/1987 | Rudy et al. ............... 369/30.43 |
| 5,077,722 A | | 12/1991 | Geist et al. |
| 5,163,112 A | | 11/1992 | Lefevre et al. |
| 5,905,696 A | * | 5/1999 | Kanazawa et al. ......... 369/13.2 |

FOREIGN PATENT DOCUMENTS

| | | |
|---|---|---|
| EP | 0 653 752 A2 | 5/1995 |
| GB | 972316 | 10/1964 |

* cited by examiner

*Primary Examiner*—Frank G Font
*Assistant Examiner*—Erin D Chiem
(74) *Attorney, Agent, or Firm*—Ladas & Parry LLP

(57) ABSTRACT

This invention relates to a wire-free sensing apparatus used in a disc system. The apparatus mainly comprises a beam emitting source installed at the case for emitting a beam, a reflector installed at the drawer for reflecting the beam, a beam receiving end installed at the case for receiving the beam reflected by the reflector, a switch installed at the drawer for controlling whether the reflector reflects the beam or not, and a one-way mirror installed at the case. The one-way mirror forms a non-right angle with an emitting direction of the beam and has a penetrating surface and a reflecting surface at opposite sides thereof wherein the beam penetrates the penetrating surface, and can be reflected by the reflector to the reflecting surface and then reflected by the reflecting surface to the beam receiving end.

13 Claims, 9 Drawing Sheets

WIRE-FREE SENSING APPARATUS FOR DISC SYSTEM

FIELD OF THE INVENTION

This invention relates generally to a sensing apparatus for a disc system, in particular to a wire-free sensing apparatus for judging whether a drawer of a disc system is properly received within a case of the disc system so as to timely save un-saved data of the disc system.

BACKGROUND OF THE INVENTION

In processing a great amount of data and messages, a computer, server or workstation needs sufficient memory space. Hard disc or other data storage devices are to provide such a memory space wherein portable hard disc not only can facilitate users to expand memory capacity but also is convenient for being carried by users. For example, RAID box (Redundant Array of Independent Disc Box) can efficiently utilize multiple hard discs thereof since each of the hard discs can share and duplicate data in other hard discs. The hard discs of the RAID box for the convenience of users are usually designed to be portable. Each of the hard discs is adopted in a drawer and the drawer is slidably received in a case. Nonetheless, when a data processing device such as a server is processing data, a user may, based on negligence or other reasons, improperly withdraw the drawer from the case and result in that data under process cannot be timely saved in the hard disc in the drawer and thus are lost. A user also may not notice that the drawer is not properly received in the case and hence cannot save the data processed.

To overcome these problems, in the conventional art, a switch is installed at the drawer, a connector such as a plug is installed at the rear of the drawer, and another connector such as a socket that can incorporate with the plug is installed at the case in the correspondent location wherein the switch is to control the plug in determining whether the plug connects with the socket or not through a wire arrangement. When the switch is at the KEY ON status, the plug at the rear of the drawer connects the socket at the case, which represents that the drawer is properly received within the case. When the switch is at the KEY OFF status, the plug at the rear of the drawer disconnects the socket at the case, which represents that the drawer is not properly received within the case and the drawer is ready for being taken out from the case. The server or computer connected to the RAID box through a detecting device can detect whether the drawer is properly received within the case and take some emergency measures such as immediately saving data or information before the drawer is taken out from the case of the RAID box and data or information is lost.

However, the conventional art has some problems, which causes inconvenience and inefficiency to users. For example, the plug and socket sometimes cannot be precisely connected because the plug and the socket are designed to be mechanically connected therebetween. Besides, there are some further disadvantages in the conventional art: (i) the additionally installed connectors (plug and socket) increase the cost of manufacture; (ii) to install the additional connectors, the manufacture has to modify the locations of the original connectors; (iii) it is difficult to install the connector socket at the inside bottom of the case; and (iv) it is difficult to make the wire arrangement for controlling the plug because the drawer is designed to be small and light and the space thereof is limited.

Therefore, an apparatus for a disc system that can overcome the problems existing in the prior art, especially to solve the problems of inconveniency and difficulty caused by the additional connectors and wire arrangement, is needed.

SUMMARY OF THE INVENTION

The primary object of the subject invention is to provide a wire-free sensing apparatus for a disc system that can overcome the inconveniency and difficulty caused by the additional connectors and wire arrangement in the conventional art. Another object of the subject invention is to provide a wire-free sensing apparatus for a disc system that can more efficiently detect whether the drawer is properly received within the case in the disc system.

The subject invention in one embodiment relates to a wire-free sensing apparatus for a disc system. The disc system contains a case and a drawer. The drawer is for adopting a data storage device and is slidably received within the case. The wire-free sensing apparatus mainly contains a beam emitting source installed at the case for emitting a beam, a reflector installed at the drawer for reflecting the beam, a beam receiving end installed at the case for receiving the beam reflected by the reflector, a switch installed at the drawer for controlling whether the reflector reflects the beam or not, and a one-way mirror, installed at the case. The one-way mirror forms a non-right angle with an emitting direction of the beam and contains a penetrating surface and a reflecting surface at opposite sides thereof wherein the beam penetrates the penetrating surface, can be reflected by the reflector to the reflecting surface, and then reflected by the reflecting surface to the beam receiving end. Whereby the disc system can judge whether the drawer is properly received within the case in determining whether the beam receiving end receives the beam.

The subject invention in another embodiment relates to a wire-free sensing apparatus for a disc system. The disc system contains a case and a drawer. The drawer is for adopting a data storage device and is slidably received within the case. The wire-free sensing apparatus mainly contains a first metal plate with an electric field installed at the case, a second metal plate corresponding to the first metal plate installed at the drawer, a controller for controlling a position of the second metal plate so as to vary a capacitance generated due to a corresponding position between the first metal plate and the second metal plate, and a detecting device installed at the case for detecting the capacitance. Whereby the disc system can judge whether the drawer is properly received within the case through variation of the capacitance.

The subject invention in a further embodiment relates to a wire-free sensing apparatus for a disc system. The disc system contains a case and a drawer. The drawer is for adopting a data storage device and is slidably received within the case. The wire-free sensing apparatus mainly contains a transformer installed at the case, a metal strip corresponding to the transformer installed at the drawer, a controller for controlling a position of the metal strip so as to vary a voltage value generated due to a corresponding position between the transformer and the metal strip, and a detecting device, installed at the case for detecting the capacitance. Whereby the disc system can judge whether the drawer is properly received within the case through variation of the voltage value.

BRIEF DESCRIPTION OF THE DRAWINGS

The above objects and advantages of the present invention will become more apparent from an ensuing description of a preferred embodiment thereof with reference to the attached drawings, in which.

DETAILED DESCRIPTION OF THE PREFERRED EMBODIMENTS

Figure 1:
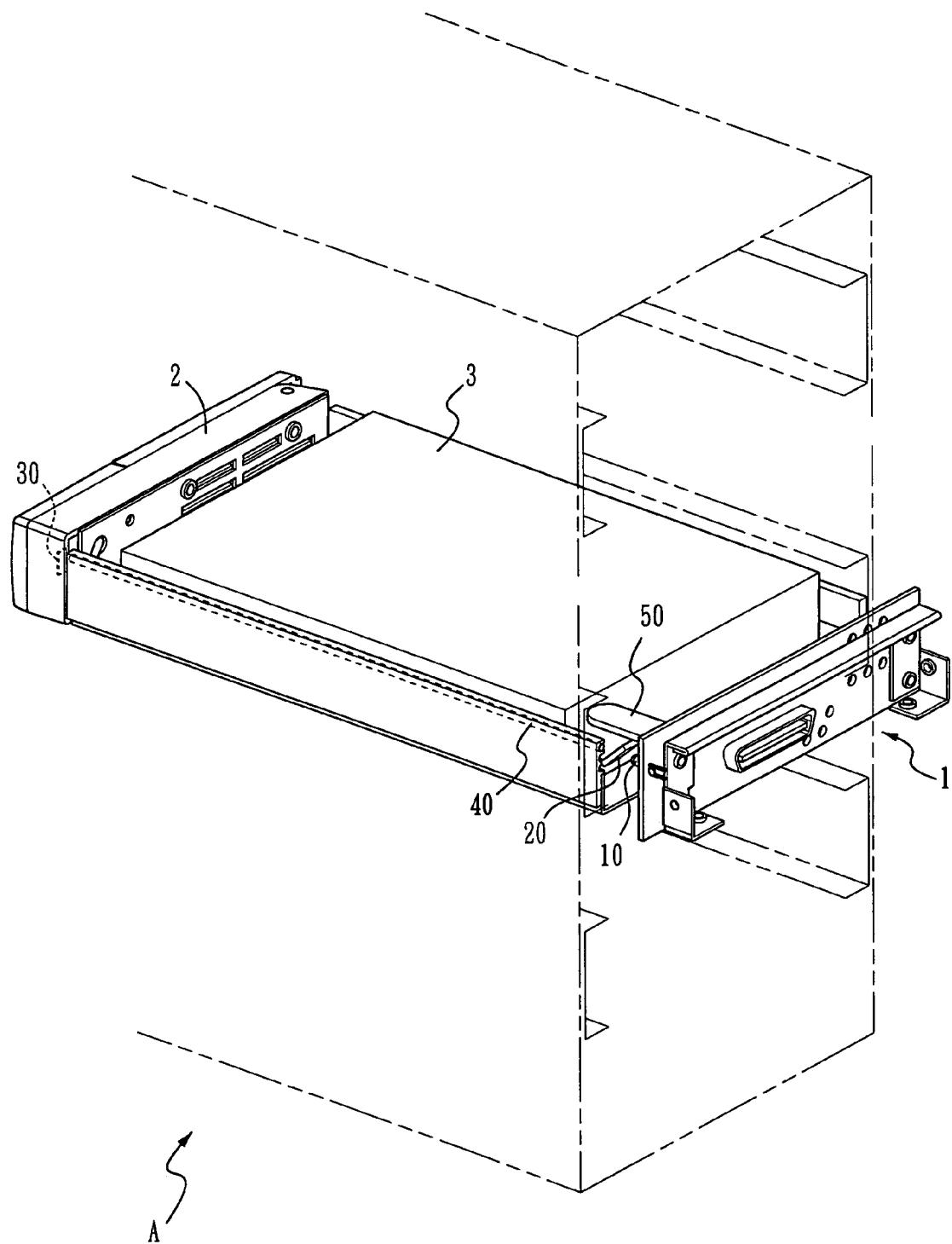
FIG. 1 is a perspective view of the first embodiment of the invention.

With reference to FIGS. 1-5, the first embodiment of the invention is a wire-free sensing apparatus for a disc system called RAID box A. The RAID box A contains a case 1 and a drawer 2. The drawer 2 is for adopting a data storage device, namely a hard disc 3 and is slidably received within the case 1. The wire-free sensing apparatus mainly contains a beam emitting source, namely an LED 10 installed at the case 1 for emitting a beam illustrated in the drawings as lines with arrowheads, a reflector 30 installed at the drawer 2 for reflecting the beam, a beam receiving end 50, installed at the case 1 for receiving the beam reflected by the reflector 30, a switch 31 installed at the drawer 2 for controlling whether the reflector 30 reflects the beam or not, and a one-way mirror 20, installed at the case 1. The one-way mirror 20 forms a 45-degree angle with the emitting direction of the beam and contains a penetrating surface 21 facing the LED 10 and a reflecting surface 22 at opposite sides thereof respectively. A light-guiding pipe 40 is installed at the drawer 2 for guiding the beam emitted from the LED 10 to the reflector 30. The light-guiding pipe 40 is preferably made of glass fiber or acrylics. The switch 31 is also for locking or unlocking the drawer 2 in the case 1. When the switch 31 is at KEY ON status, the drawer 2 is locked; while when the switch 31 is at KEY OFF status, the drawer 2 is unlocked and can be freely taken out of the case 1.

Figure 2:
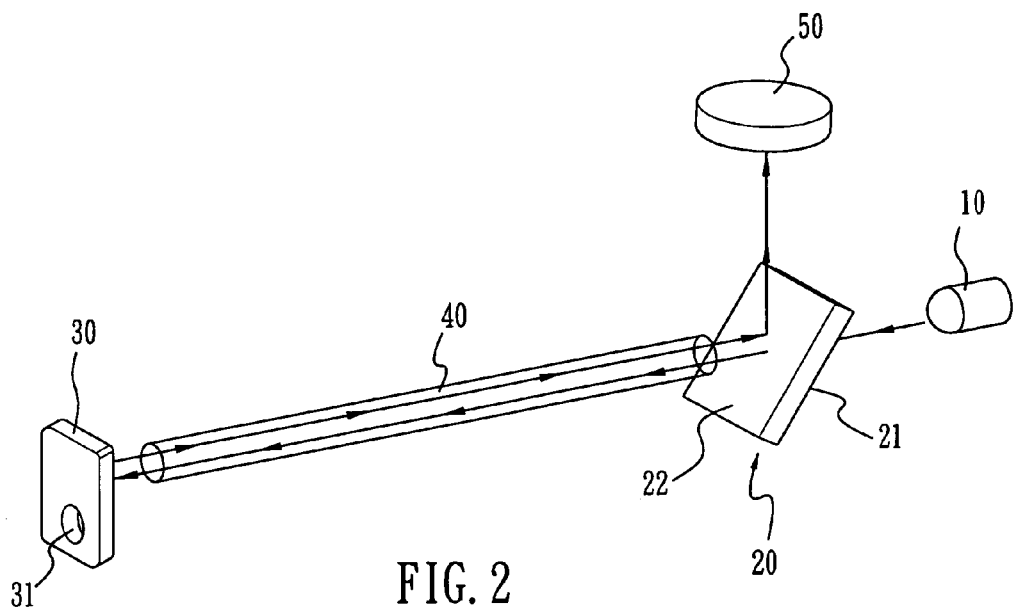
FIG. 2 is a schematic view of the first embodiment illustrating the essential elements thereof when the switch is at the KEY ON status.
Figure 3:
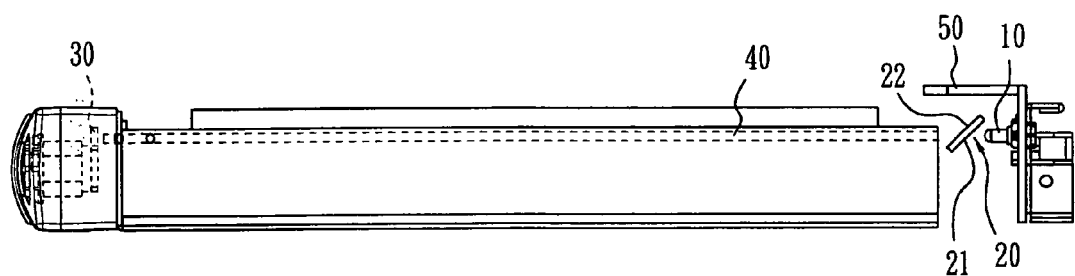
FIG. 3 is a side elevational view of the first embodiment when the switch is at the KEY ON status.
Figure 4:
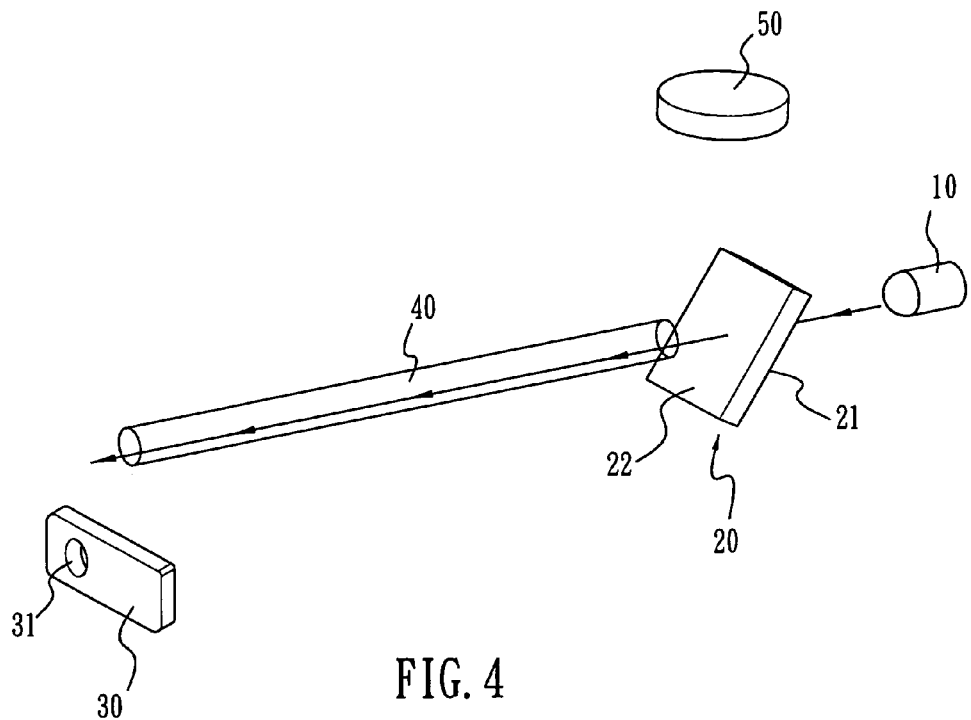
FIG. 4 is a schematic view of the first embodiment illustrating the essential elements thereof when the switch is at the KEY OFF status.

With reference to FIGS. 2 and 4, the switch 31 is mounted to the reflector 30. Hence, turning the switch 31 also turns the reflector 30. Referring to FIGS. 2 and 3, when the switch 31 is at KEY ON status, the reflector 30 is driven to a position in the path of the beam. The beam emitted from the LED 10 penetrates the penetrating surface 21 of the one-way mirror 20, guided by the light-guiding pipe 40 to the reflector 30, reflected by the reflector 30 to the reflecting surface 22 of the one-way mirror 20, and then reflected by the reflecting surface 22 to the beam receiving end 50. The beam receiving end 50 through a software sends a message to a data processing device such as a server (not shown) to inform the server that the drawer 2 is properly received within the case 1.

Figure 5:
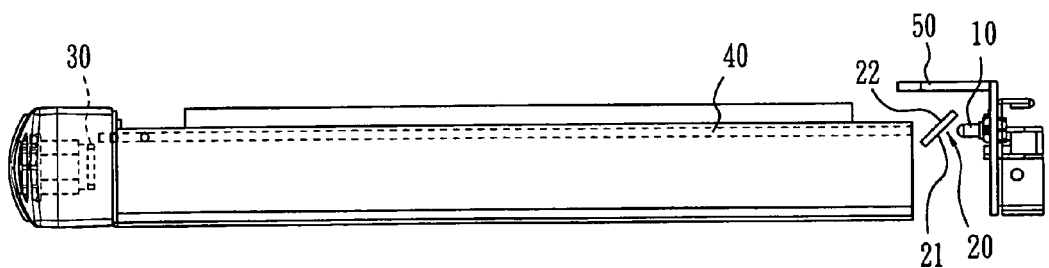
FIG. 5 is a side elevational view of the first embodiment when the switch is at the KEY OFF status.
Figure 6:
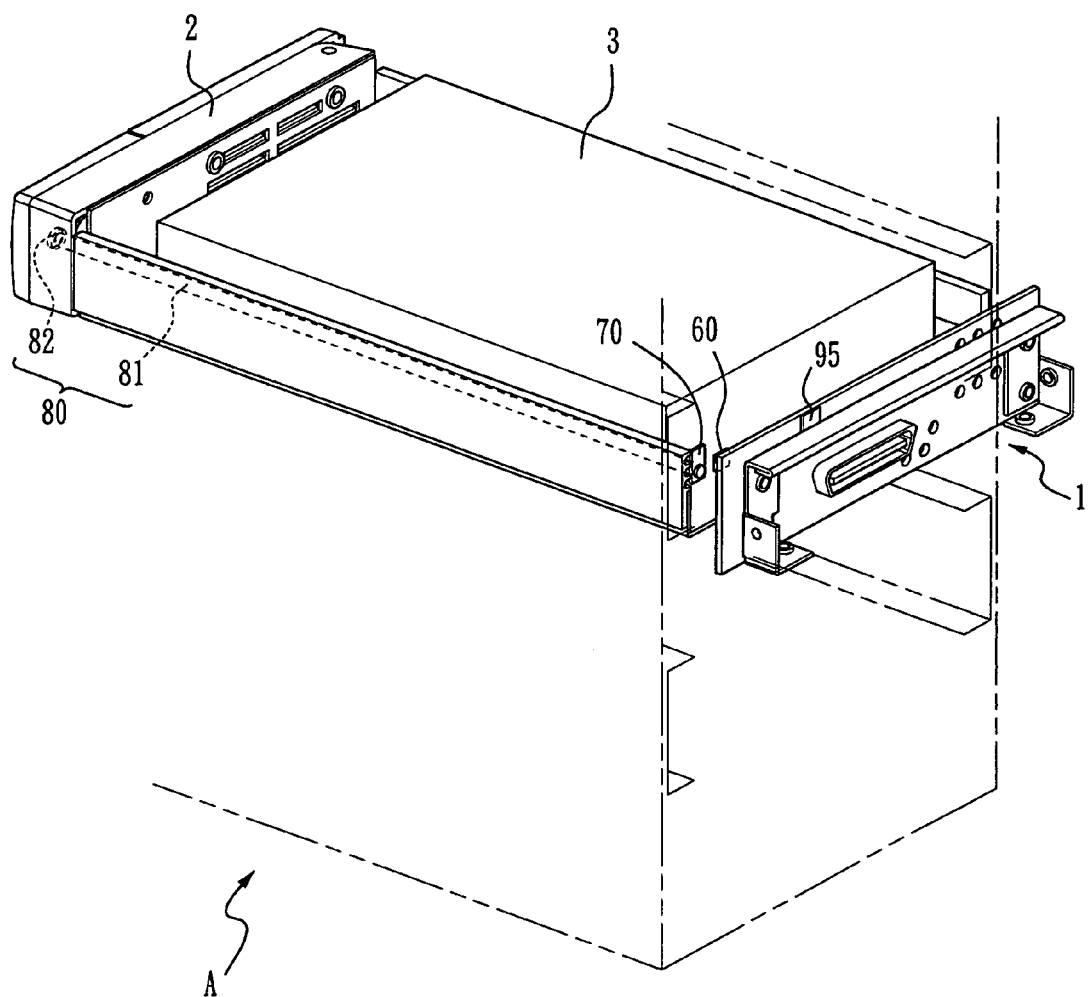
FIG. 6 is a perspective view of the second embodiment of the invention.

With reference to FIGS. 4 and 5, when the switch 31 is at KEY OFF status, the switch 31 is turned and the reflector 30 is driven thereby to a position out of the path of the beam. Hence, the beam emitted from the LED 10 after penetrating the penetrating surface 21 of the one-way mirror 20 will not be reflected and therefore the beam receiving end 50 will not receive the beam. The beam receiving end 50 sends a message through the software to warn the server that the drawer 2 is not properly received within the case 1. The server through its operation system within a couple of seconds immediately saves the un-saved data to the hard disc 3 in the drawer 2 before the hard disc 3 disconnects the RAID box A due to the drawer 2 being taken out from the case 1. Alternatively, once knowing the drawer 2 is not properly received with the case 1, the server can generate a warning message such as alarm to the user and/or at the same time immediately save the un-saved data.

Due to limited space, the reflector 30 may not be installed in the direct path of the beam emitted from the LED 10 at the drawer 2 in some disc systems. In such a situation, the light-guiding pipe 40 can be designed in a winding shape to adapt to the location of the reflector 30.

The LED 10 is replaceable by other light-concentrating sources such as laser emitter or infrared ray emitter. The server is replaceable by a computer or a workstation. Opposite to the first embodiment, it can be arranged in other embodiments that when the beam receiving end 50 does not receive the beam, the drawer 2 is properly received within the case 1. Besides, the server can be physically united with the disc system and share the same housing. To achieve the object of the invention, the one-way mirror 20 can form any non-right angle with the emitting direction of the beam.

With reference to FIGS. 6-10, the second embodiment of the invention is a wire-free sensing apparatus for a disc system called RAID box A. The RAID box A contains a case 1 and a drawer 2. The drawer 2 is for adopting a data storage device, namely hard disc 3, and is slidably received within the case 1. The wire-free sensing apparatus mainly contains a first metal plate 60 with an electric field, installed at the case 1, a second metal plate 70 corresponding to the first metal plate 60 installed at the drawer 2, a controller 80 for controlling a position of the second metal plate 70 so as to vary a capacitance generated due to a corresponding position between the first metal plate 60 and the second metal plate 70, and an RC oscillator 95 installed at the case 1 for detecting the capacitance. The controller 80 contains a switch 82 and a control rod 81. The control rod 81 connects to the switch 82 with one end and connects to the second metal plate 70 with the other end wherein the position of the second metal plate 70 varies in accordance with rotation of the switch 82.

Capacitor (or condenser) is constituted by two parallel conductive plates separated by insulation material and therefore possesses the capacity of storing electricity. The first metal plate 60 with an electric field and the second metal plate 70 separated by air constitute a capacitor. According to the formula C=(∈A)/d, the capacitance C of the capacitor is directly proportional to the overlapped area A of the first metal plate 60 and the second metal plate 70 and the dielectric constant ∈, and is inversely proportional to the distance d between the first metal plate 60 and the second metal plate 70. When the dielectric constant ∈ and the distance d between the first metal plate 60 and the second metal plate 70 are constant, the capacitance C varies in accordance with the overlapped area A. The controller 80 controls the position of the second metal plate 70 and thereby controls the overlaped area A of the first metal plate 60 and the second metal plate 70. Therefore the controller 80 can vary the capacitance of the capacitor. A RC oscillator 95 is installed at the case 1 for detecting the capacitance.

Figure 7:
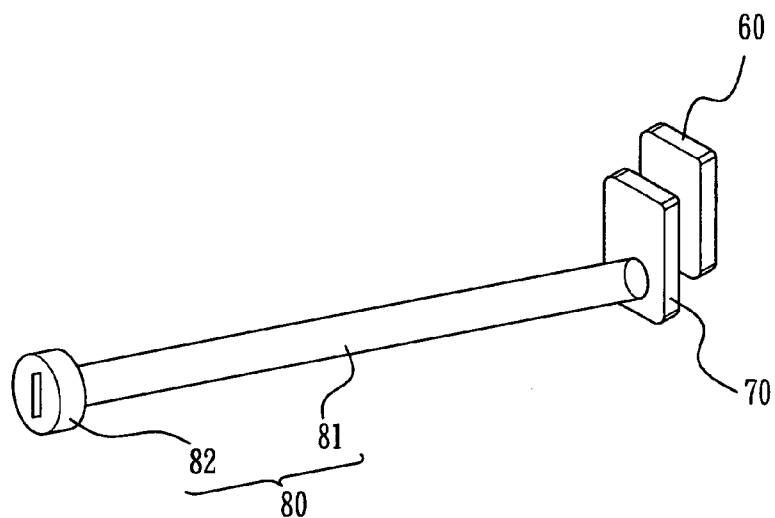
FIG. 7 is a schematic view of the second embodiment illustrating the essential elements thereof when the switch is at the KEY ON status.
Figure 8:
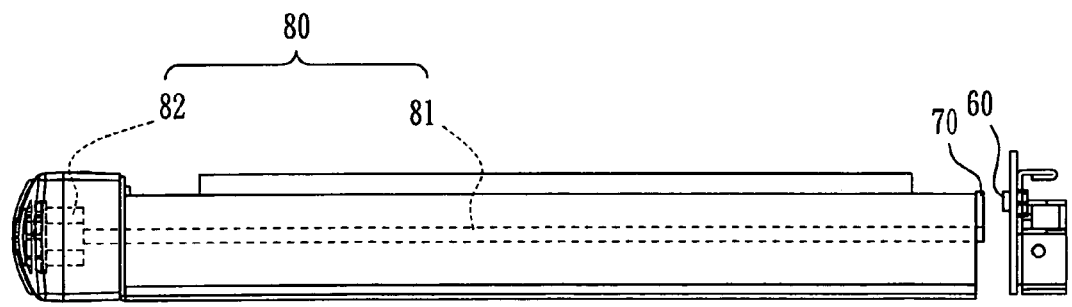
FIG. 8 is a side elevational view of the second embodiment when the switch is at the KEY ON status.
Figure 9:
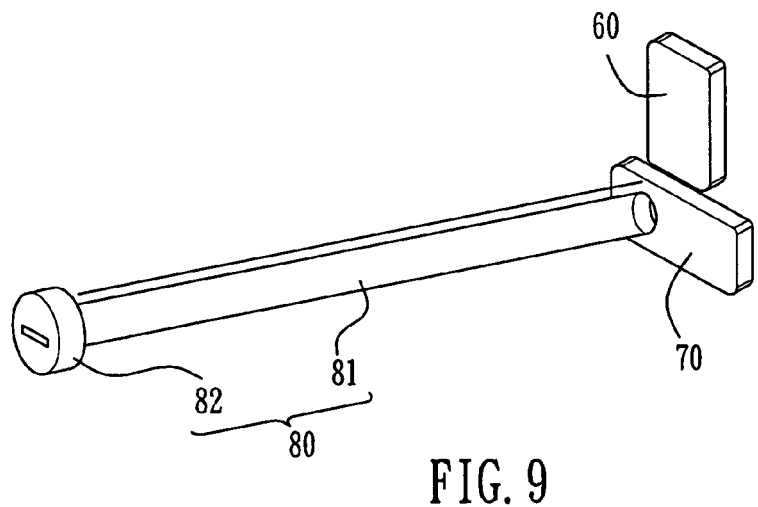
FIG. 9 is a schematic view of the second embodiment illustrating the essential elements thereof when the switch is at the KEY OFF status.
Figure 10:
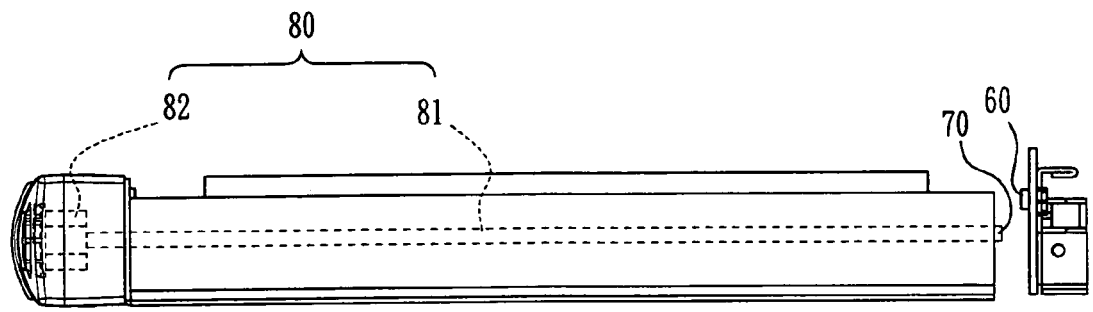
FIG. 10 is a side elevational view of the second embodiment when the switch is at the KEY OFF status.
Figure 11:
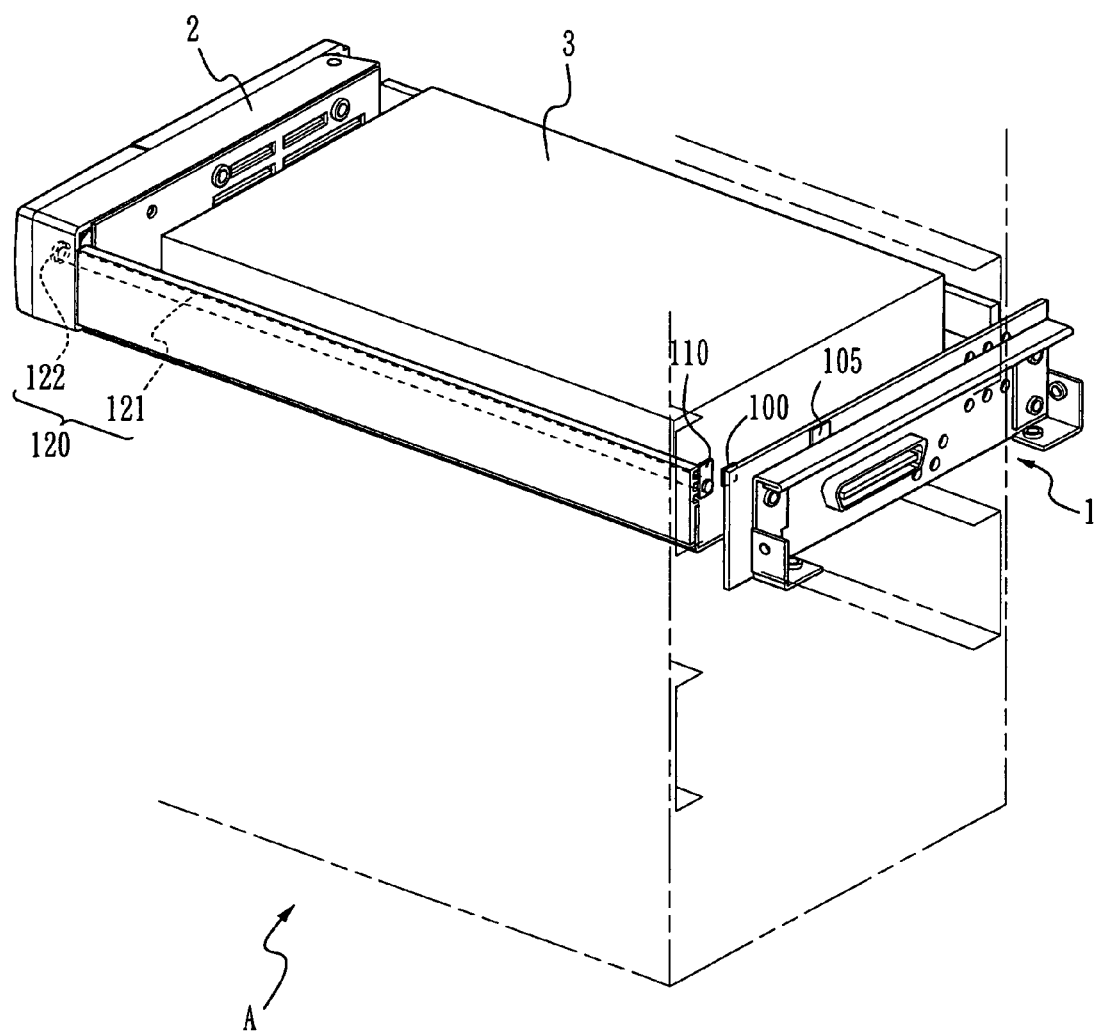
FIG. 11 is a perspective view of the third embodiment of the invention.

With reference to FIGS. 7 and 8, when the switch 82 is at the KEY ON status, the first metal plate 60 and the second metal plate 70 have the maximum overlapped area and the capacitance thereof is maximized while the RC oscillator 95 has the lowest oscillation frequency. On the other hand, referring to FIGS. 9 and 10, when the switch 82 is at the KEY OFF status, the first metal plate 60 and the second metal plate 70 have the minimum overlapped area and the capacitance thereof is minimized while the RC oscillator 95 has the highest oscillation frequency. Therefore, the RAID box A can judge whether the drawer 2 is properly received within the case 1 through variation of oscillation frequency of the oscillator 95 and the RAID box A or the server connected thereto can generate a warning message, such as alarm, to the user and/or at the same time immediately save the un-saved data.

With reference to FIGS. 11-15, the third embodiment of the invention is a wire-free sensing apparatus for a disc system called RAID box A. The RAID box A contains a case 1 and a drawer 2. The drawer 2 is for adopting a data storage device, namely hard disc 3 and is slidably received within the case 1. The wire-free sensing apparatus mainly contains a transformer 100 installed at the case 1, a metal strip 110 corresponding to the transformer 100 installed at the drawer 2, a controller 120 for controlling a position of the metal strip 110 so as to vary a voltage value generated due to a corresponding position between the transformer 100 and the metal strip 110, and a detecting device 105, installed at the case 1 for detecting the voltage value. The controller 120 contains a switch 122 and a control rod 121. The control rod 121 connects to the switch 122 with one end and connects to the metal strip 110 with another end wherein the position of the metal strip 110 varies in accordance with rotation of the switch 122.

Figure 12:
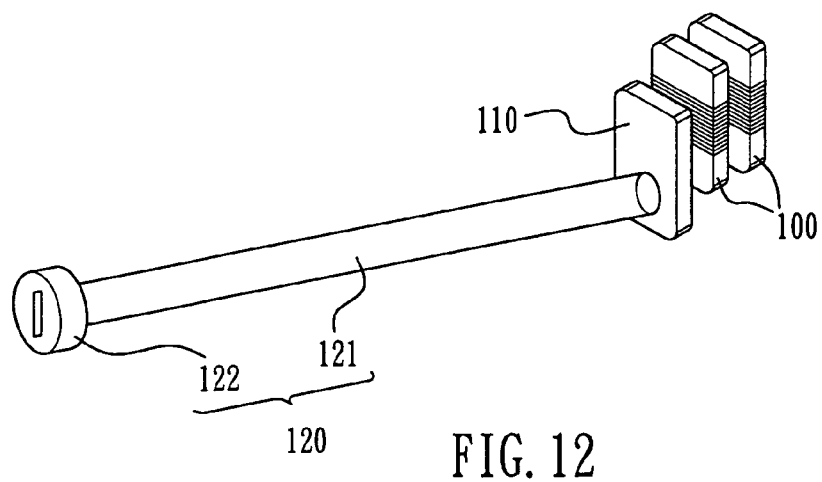
FIG. 12 is a schematic view of the third embodiment illustrating the essential elements thereof when the switch is at the KEY ON status.
Figure 13:
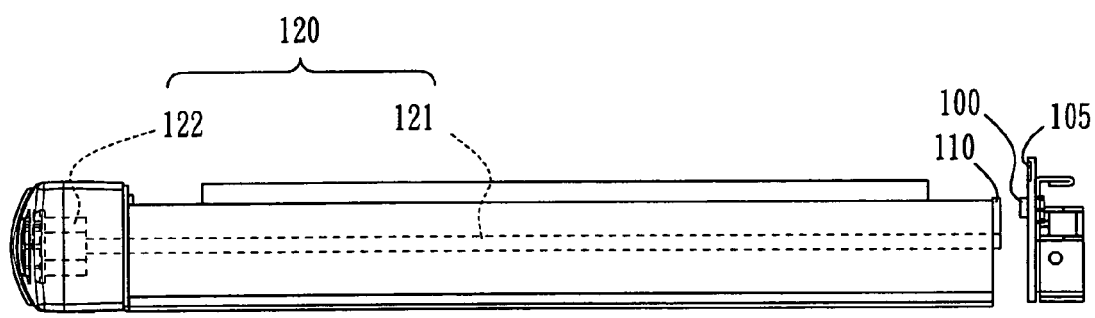
FIG. 13 is a side elevational view of the third embodiment when the switch is at the KEY ON status.
Figure 14:
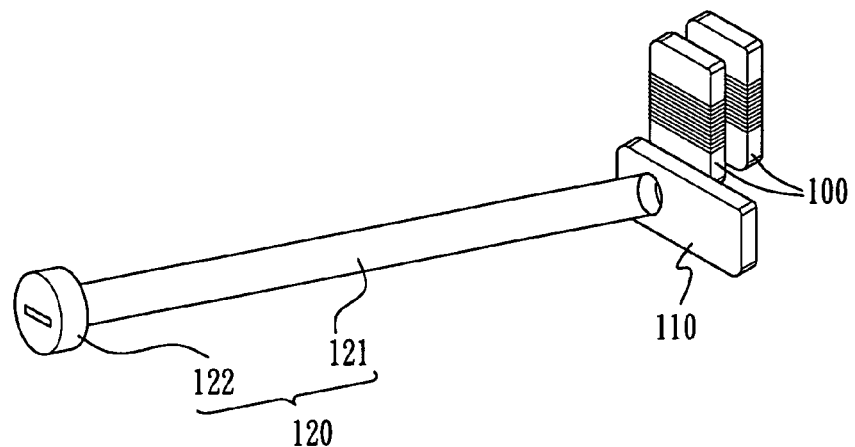
FIG. 14 is a schematic view of the third embodiment illustrating the essential elements thereof when the switch is at the KEY OFF status.
Figure 15:
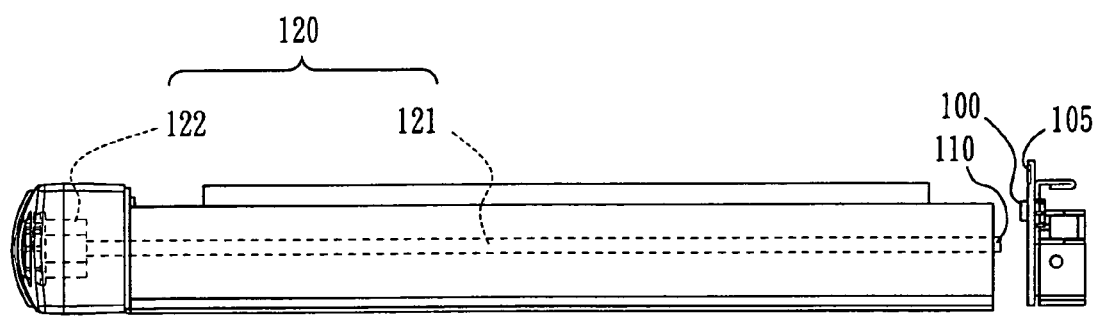
FIG. 15 is a side elevational view of the third embodiment when the switch is at the KEY OFF status.

With reference to FIGS. 12 and 13, when the switch 122 is at the status of KEY ON, the transformer 100 and the metal strip 110 have the maximum interacting area and the detecting device 105 detects the maximum voltage value. On the other hand, referring to FIGS. 14 and 15, when the switch 122 is at the KEY OFF status, the interacting area between the transformer 100 and the metal strip 110 is minimized and the detecting device 105 detects the minimum voltage value. Therefore, the RAID box A can judge whether the drawer 2 is properly received within the case 1 through detection of the variation of the voltage value.

The controllers 80, 120 in the second and the third embodiments can use other ways to achieve the goals of controlling the rotations of the second metal plate 70 and the metal strip 110. For example, the controller(s) can control the position of the metal strip 110 by sending an electrical signal through wire arrangements. The switches 31, 82, 122 in the three embodiments can be installed at the rear or other places of the drawer 2. The RC oscillator 95 in the second embodiment and the detecting device 105 can be made in the forms of chip sets.

The invention may also be implemented in other specific modes without departing from the spirit and the essence of the invention. Thus, the above-mentioned embodiments shall be regarded as explanatory but not restrictive. All changes in consistence with the meaning and range of the claims and the equivalents shall fall within the scope claimed by the invention.

We claim:

1. A wire-free sensing apparatus for a disc system, said disc system comprising a case and a drawer, said drawer being for adopting a data storage device and slidably received within said case, said wire-free sensing apparatus comprising:
    a beam emitting source, installed at a rear end of said case for emitting a beam;
    a reflector, installed at a front end of said drawer for reflecting said beam, and being movable to a straight emitting direction of said beam;
    a beam receiving end, installed at said case, being depart from said straight emitting direction of said beam for selectively receiving said beam reflected by said reflector;
    a switch, installed at said drawer for controlling whether said reflector reflects said beam or not, when said switch is at a KEY ON status, said reflector reflects said beam, and when said switch is at a KEY OFF status, said reflector does not reflects said beam; and
    a one-way mirror, installed at said case and positioned under said beam receiving end, and between said beam emitting source and said reflector, said one-way mirror forming an approximately 45 degree angle with the straight emitting direction of said beam, said one-way mirror comprising a penetrating surface at one side thereof facing said beam emitting source and a reflecting surface at the opposite side thereof facing said reflector, said penetrating surface being parallel to said reflecting surface;
    wherein when said switch at the KEY ON status, said beam penetrates said penetrating surface to said reflector, and is then reflected by said reflector in an opposite direction of said straight emitting direction of said beam to said reflecting surface and thereafter is perpendicularly deflected by said reflecting surface to said beam receiving end; whereby said disc system can judge whether said drawer is properly received within said case in determining whether said beam receiving end receives said beam.

2. The wire-free sensing apparatus of claim 1, wherein said beam emitting source is a light emitting diode (LED).

3. The wire-free sensing apparatus of claim 1, wherein said beam emitting source is a laser emitter.

4. The wire-free sensing apparatus of claim 1, wherein said beam emitting source is an infrared ray emitter.

5. The wire-free sensing apparatus of claim 1 further comprising a light-guiding pipe installed at said drawer for guiding said beam emitted from said beam emitting source to said reflector.

6. The wire-free sensing apparatus of claim 5 wherein said light-guiding pipe is a winding light-guiding pipe for being adapted to the location of said reflector.

7. The wire-free sensing apparatus of claim 5 wherein said light-guiding pipe is made of glass fiber.

8. The wire-free sensing apparatus of claim 5 wherein said light-guiding pipe is made of acrylics.

9. The wire-free sensing apparatus of claim 5 wherein said beam receiving end sends a message to a data processing device informing said data processing device whether said drawer is properly received within said case so that said data processing device can timely save un-saved data to said data storage device in said drawer.

10. The wire-free sensing apparatus of claim 9 wherein said data processing device is a computer.

11. The wire-free sensing apparatus of claim 9 wherein said data processing device is a server.

12. The wire-free sensing apparatus of claim 1 wherein when said beam receiving end receives said beam, said drawer is judged as being properly received within said case.

13. The wire-free sensing apparatus of claim 1 wherein when said beam receiving end does not receive said beam, said drawer is judged as being properly received within said case.

* * * * *